US011500087B2

(12) United States Patent
Bagdonat et al.

(10) Patent No.: US 11,500,087 B2
(45) Date of Patent: Nov. 15, 2022

(54) METHOD FOR RADAR CLASSIFICATION OF A ROAD SURFACE

(71) Applicants: Conti Temic microelectronic GmbH, Nuremberg (DE); Volkswagen AG, Wolfsburg (DE)

(72) Inventors: Thorsten Bagdonat, Braunschweig (DE); Marc-Michael Meinecke, Sassenburg (DE); Andreas Löffler, Weiler-Simmerberg (DE); Thomas Fechner, Wasserburg (DE)

(73) Assignees: Conti Temic microelectronic GmbH, Nuremberg (DE); Volkswagen AG, Wolfsburg (DE)

(*) Notice: Subject to any disclaimer, the term of this patent is extended or adjusted under 35 U.S.C. 154(b) by 213 days.

(21) Appl. No.: 16/756,447

(22) PCT Filed: Oct. 15, 2018

(86) PCT No.: PCT/EP2018/078074
§ 371 (c)(1),
(2) Date: Apr. 15, 2020

(87) PCT Pub. No.: WO2019/076812
PCT Pub. Date: Apr. 25, 2019

(65) Prior Publication Data
US 2020/0256980 A1    Aug. 13, 2020

(30) Foreign Application Priority Data
Oct. 16, 2017   (DE) .......................... 102017123969.3

(51) Int. Cl.
*G01S 13/89* (2006.01)
*B60W 40/064* (2012.01)
(Continued)

(52) U.S. Cl.
CPC ............ *G01S 13/89* (2013.01); *B60W 40/064* (2013.01); *G01S 7/412* (2013.01); *G01S 7/414* (2013.01);
(Continued)

(58) Field of Classification Search
CPC .......... G01S 13/89; G01S 7/412; G01S 7/414; G01S 7/415; G01S 13/931;
(Continued)

(56) References Cited

U.S. PATENT DOCUMENTS 10,127,462 B1    11/2018  Pratt et al.
2013/0018575 A1*  1/2013  Birken .................... G01S 13/00
                                                    701/514

(Continued)

FOREIGN PATENT DOCUMENTS

DE          19545704 A1     6/1997
DE          19932094 A1     1/2001
(Continued)

OTHER PUBLICATIONS

Office Action dated Jun. 5, 2019, issued in German Application No. 10 2017 123 969.3, filed Oct. 16, 2017, 9 pages.
Search Report dated Oct. 9, 2018, issued in German Application No. 10 2017 123 969.3, filed Oct. 16, 2017, 9 pages.
Office Action dated Nov. 3, 2021, issued in European Application No. 18 789 070.2, 18 pages.

*Primary Examiner* — Donald H B Braswell
(74) *Attorney, Agent, or Firm* — Christensen O'Connor Johnson Kindness PLLC

(57) ABSTRACT

A method for classification of ground conditions in the vicinity of a vehicle using a radar sensor, comprising: receiving reflected portions of a radar signal at a receiver unit of a radar system; calculating information derived from the received portions of the radar signal for discrete spatial regions by the radar system or a control unit connected
(Continued)

Figure 1:
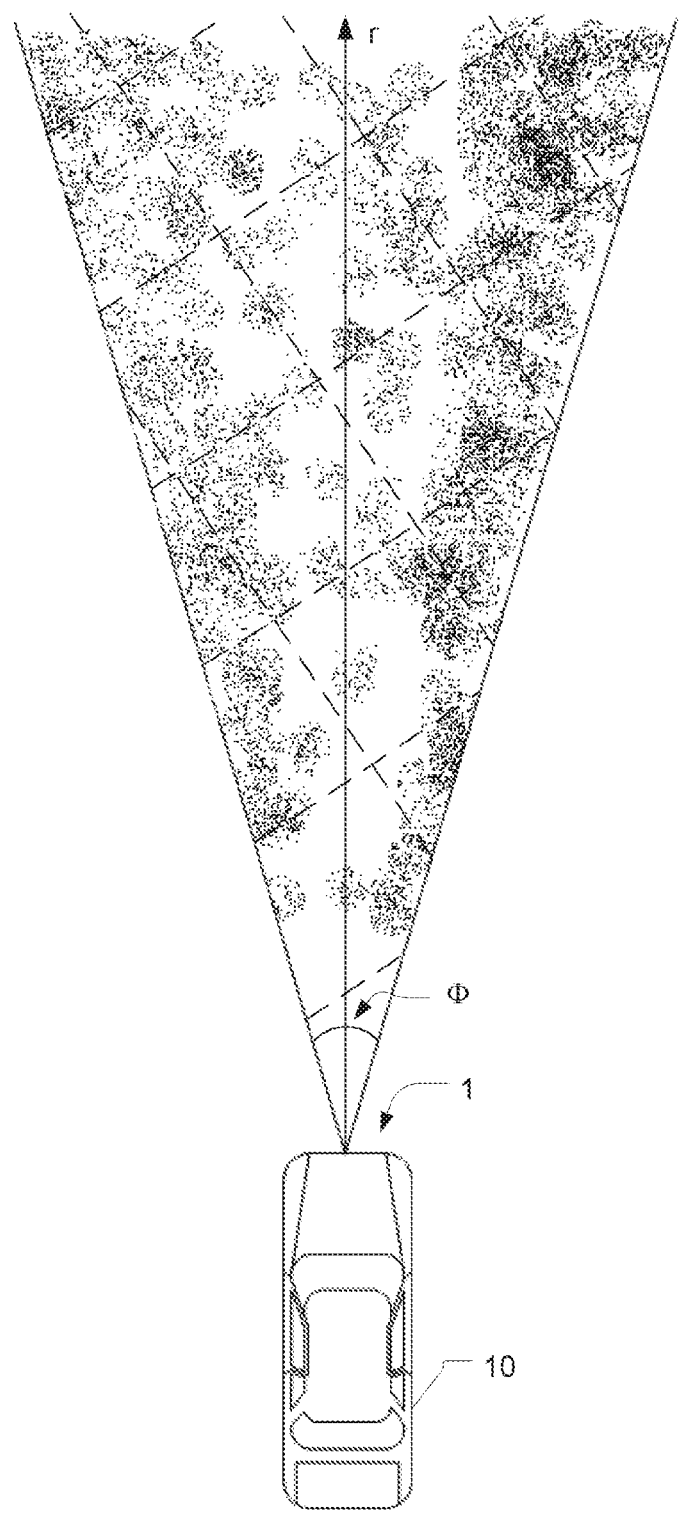

thereto; assigning the information to data structure units associated with a geographical location and the assignment of the information taking into account movement of the vehicle; collecting pieces of information in the respective data structure units, the pieces of information being obtained from reflected portions of radar signals transmitted at different times; evaluating the information contained in the data structure using a classifier to obtain information regarding the ground condition; assigning ground condition types to the data structure units based on evaluation results obtained by the classifier.

15 Claims, 6 Drawing Sheets

(51) Int. Cl.
  *G01S 7/41* (2006.01)
  *G01S 13/931* (2020.01)
  *G08G 1/16* (2006.01)

(52) U.S. Cl.
  CPC ............ *G01S 7/415* (2013.01); *G01S 13/931* (2013.01); *G08G 1/165* (2013.01); *G01S 2013/932* (2020.01); *G01S 2013/93271* (2020.01)

(58) Field of Classification Search
  CPC .... G01S 2013/932; G01S 2013/93271; B60W 40/064; G08G 1/165; G08G 1/0112
  See application file for complete search history.

(56) References Cited

U.S. PATENT DOCUMENTS

| | | |
|---|---|---|
| 2014/0121964 A1 | 5/2014 | Stanley et al. |
| 2015/0077282 A1* | 3/2015 | Mohamadi ................ G01S 1/02 342/450 |
| 2015/0266472 A1* | 9/2015 | Ferguson ............. G05D 1/0251 701/1 |
| 2015/0268218 A1* | 9/2015 | Troxler .................. G01N 33/42 342/21 |
| 2015/0375753 A1* | 12/2015 | Schräbler ............ B60W 40/068 356/445 |
| 2016/0252611 A1 | 9/2016 | Guecker et al. |
| 2017/0176998 A1 | 6/2017 | Fechner et al. |
| 2017/0248953 A1 | 8/2017 | Kelley et al. |
| 2017/0307735 A1* | 10/2017 | Rohani ................... G01S 13/89 |
| 2018/0024238 A1 | 1/2018 | Khlifi |
| 2018/0181818 A1 | 6/2018 | Shimotani et al. |
| 2018/0252810 A1* | 9/2018 | Uotsu ..................... G01S 7/412 |

FOREIGN PATENT DOCUMENTS

| | | |
|---|---|---|
| DE | 10 2013 017 347 A1 | 4/2015 |
| DE | 10 2014 210 770 A1 | 12/2015 |
| DE | 10 2015 001 386 A1 | 8/2016 |
| DE | 10 2015 003 115 A1 | 9/2016 |
| DE | 10 2016 200 642 A1 | 7/2017 |
| DE | 10 2017 000 753 A1 | 7/2017 |
| DE | 10 2017 103 969 A1 | 8/2017 |
| WO | 2014/065856 A1 | 5/2014 |
| WO | 2017/029734 A1 | 2/2017 |

* cited by examiner

METHOD FOR RADAR CLASSIFICATION OF A ROAD SURFACE

The present disclosure relates to a method and a radar system for classification of the ground conditions in the vicinity of a motor vehicle.

Robust awareness of the vicinity is required for vehicles with autonomous driving capabilities. This robustness can be achieved through redundancy or complementarity in the sensors. Herein, complementarity means that different, complementary sensor data are evaluated in order to fuse them into a common detection result.

In today's systems, optical features, for example lane markings, are essentially used for lane detection. These are detected using optical detection systems, for example cameras, etc. For redundancy, it is necessary to collect information about the course of the lane using different sensors, for example in laser or radar systems. Systems of this type are known to be able to detect boundary structures in the vicinity with a relatively large backscatter cross section, for example guard rails, road curbs, etc., which provide information about the course of the road. The boundary structures may be roughly classified based on the measured backscatter cross section.

A disadvantage of the radar systems known so far is that they cannot be used to detect lanes if there is no clear boundary structure with a significant backscatter cross section. So far, the available radar systems have not been able to achieve a classification of the ground conditions solely from the backscattering behavior of the respective ground structure.

In view of the above, the present disclosure describes a method which allows a classification of the ground conditions into ground condition types from the reflected components of a radar signal so that conclusions can be drawn about the course of the road.

The object is achieved by a method having the features of independent claim 1. Preferred embodiments are the subject matter of the dependent claims. A radar system for classifying the ground conditions in the vicinity of a vehicle is the subject matter of an independent claim.

According to a first aspect, the present disclosure describes a method for classification of the ground conditions in the vicinity of a vehicle by means of a radar sensor. The method comprises the following steps:

First, reflected portions of a radar signal are received at a receiver unit of a radar system. The radar signals are preferably in the frequency range between 76 GHz and 81 GHz in order to achieve the highest possible resolution, but may also be selected in the frequency range of 24 GHz.

Suitable mathematical methods, for example a transformation into the spectral domain, in particular a Fast Fourier Transformation (FFT), are used to derive information relating to discrete spatial regions of a radar image from the received portions of the radar signal by the radar system or an associated control unit. The information may relate, for example, to the amplitude of the received reflected portion of the radar signal, to the power of the received reflected portion of the radar signal, to the complex representation of the received reflected portion of the radar signal, etc., or may be measurement values derived from these quantities.

The information obtained in this way is assigned to data structure units of a data structure. Each data structure unit is assigned to a fixed geographical location and the information is assigned to the respective data structure unit taking into account the movement information of the vehicle. In other words, the data structure units correspond to raster regions of a radar map which is geographically stationary, i.e. not moved with the vehicle, and the assignment of information to the data structure units takes into account the location of the reflection that caused the generation of the information in the radar system and with compensation for a movement of the vehicle.

Preferably, the radar sensor sequentially takes a large number of individual measurements, each of which results in the information described above. This sequentially obtained information is spatially resolved in the data structure units, i.e. stored according to the location of the reflection that caused the generation of the information. In other words, a large amount of information is collected in the respective data structure units, the information being obtained from reflected portions of radar signals transmitted at different times. After a plurality of individual measurements, each data structure unit thus comprises a plurality of information obtained at different times, so that the temporal evolution of the reflections at the respective location can be evaluated based on the information contained in the respective data structure unit.

For the classification of the ground conditions, the information contained in the data structure is evaluated using a classifier in order to obtain information regarding the ground conditions. In particular, the classifier may be configured to extract characteristics essential for the classification of the ground conditions from the information and to compare them with known criteria in order to draw conclusions as to which ground condition type is present at the respective location.

Subsequently, the ground condition types characterizing the ground conditions are assigned to the data structure units based on evaluation results obtained by the classifier. This allows a statement to be made as to which ground condition type is present on the respective raster region of the radar map assigned to the respective data structure unit.

The main advantage of the method according to the present disclosure is that planar structures can be classified from the spatial and temporal evolution of the power spectrum determined by the radar sensor, for example according to the categories asphalt, grass, pavement, etc., whereby the course of the road can be estimated.

According to an exemplary embodiment, only information generated by reflections on non-moving, i.e. stationary targets, are used for the classification of the ground conditions. In other words, all of the information recognizably related to moving targets, for example from the Doppler shift, is not supplied to the data structure units and is therefore not used to classify the ground conditions.

According to an exemplary embodiment only information, for example signal or measurement values, the amplitude or signal strength of which is below a threshold value or a threshold value curve is used when evaluating the information contained in the data structure by means of a classifier. In the usual evaluation of radar signals, the evaluation of information is performed in the opposite way, i.e. only signal or measurement values with a high amplitude are used in order to select the main reflections and thus to minimize the required computing power. The present disclosure, on the other hand, discloses an embodiment that evaluates the signal or measurement values in the low amplitude range since these often result from ground reflections and thus conclusions can be drawn about ground conditions.

According to an exemplary embodiment, the information stored in the data structure is signal values or measurement values proportional to the power of the reflected portion of the radar signal in a discrete spatial region or quantities derived therefrom. The power of the reflected portion of the radar signal is a measure of the backscatter cross section of the object or structure on which the reflection occurred. The ground condition can be inferred from the temporal and spatial evolution of the signal values.

According to an exemplary embodiment, the information stored in the data structure is signal values or measurement values assigned to the data structure units without magnitude limitation or at least without trimming in the lower amplitude range of the signal values. It is thereby achieved that in particular signal or measurement values in the low amplitude range are stored in the data structure units in order to be able to carry out a ground condition classification based on the information in the low amplitude range.

According to an embodiment, each data structure unit is assigned to a raster region of a two-dimensional radar map. In particular, said radar map is a fixed radar map related to a fixed geographical point, i.e. not moving with the vehicle. Classification information obtained from the data structure units may thus be transferred to raster regions of the radar map.

According to an exemplary embodiment, information associated with a specific discrete spatial region is assigned to a single data structure unit, or information associated with a specific discrete spatial region is assigned to a plurality of data structure units, said data structure units being correlated with adjacent raster regions of the two-dimensional radar map. For example, the radar sensor may provide a spatially discretized radar image moving with the vehicle into which the information provided by the radar system, in particular the power of the radar signal reflected at the respective location, is entered. Herein, the discretization of the moving radar image may be different from the discretization of the data structure into data structure units or different from the discretization of the stationary radar map. In other words, the size of the raster regions of the moving radar may be chosen to be the same as or different from the size of the raster areas of the fixed radar map. The moving radar image preferably has a coarser discretization than the fixed radar map. Thereby, the information that is obtained in an individual measurement and is associated with a raster region of the moving radar image is assigned to a group of a plurality of data structure units or a group of a plurality of raster regions of the fixed radar map. Each group of raster regions of the fixed radar map are arranged adjacent to one another. This achieves a higher resolution and significantly improves the accuracy of the ground condition classification.

According to an embodiment, the information contained in the data structure is evaluated separately based on the information contained in a data structure unit. In other words, the information of a data structure unit is evaluated without taking into account information from other data structure units. In this way, for example, the power spectrum detected with respect to a location can be used for ground condition classification.

According to an exemplary embodiment, the information contained in a data structure unit of the data structure is evaluated with regard to temporal/spectral properties. As described above, information from a plurality of individual measurements that have been carried out sequentially is stored in each data structure unit. This is in contrast to known methods in which the reflected power values obtained with respect to a location are summed up. That is, in the known methods, after a plurality of individual measurements, there is not a plurality of pieces of information available per raster region of the fixed radar map, but rather only a sum value is formed by summing up a plurality of pieces of information or measurement quantities. From the temporal evolution of the information recorded with respect to a location, an advantageous ground condition classification can be derived.

According to an exemplary embodiment, the information contained in the data structure is evaluated on the basis of groups of data structure units, each group of data structure units including a plurality of data structure units correlated with adjacent raster regions of the two-dimensional radar map. As a result, information across data structure units may be used for ground condition classification and thus the location-dependent properties of the stored information may be evaluated.

According to an exemplary embodiment, the information contained in a plurality of data structure units of the data structure is evaluated across data structure units with regard to temporal/spectral properties. On the one hand, the change in the information as a function of time (and therefore due to the movement of the vehicle from different directions) can be determined from the temporal evolution of the information detected with respect to a location, and on the other hand, taking into account the information from a plurality of data structure units, the change in the information as a function of location (for example in a region with a close spatial relationship) can be determined. By analyzing the location dependency of the reflections, for example, locally different structure sizes may be recognized. As a result, an improved classification of the ground conditions into the different ground condition types can be achieved.

According to an exemplary embodiment, the classifier uses statistical classifiers, machine-learning or model-based methods. In particular, a so-called "deep learning" method can be used, for example using a neural network, for example a "convolutional neural network" (CNN). This allows for high classification accuracy.

According to an exemplary embodiment, a correction step is carried out, wherein ground condition types at least partially assigned to the data structure units are corrected based on information from data structure units correlated with adjacent raster regions of the two-dimensional radar map. In other words, classification errors in the area of a data structure unit or a raster region are eliminated based on information from other data structure units. This correction step may be based on known correction or smoothing methods. As a result, individual classification errors can be effectively eliminated by using classification results in the adjacent raster regions.

According to an exemplary embodiment, a course of a road is estimated based on the ground condition types assigned to the data structure units. For example, based on the identified ground condition types, contiguous areas of a certain ground condition type or boundary lines between different ground condition types may be recognized. These boundary lines may then be used for estimating the course of the road, in particular for an estimation of the course of the road complementing an optical, for example camera-based, method.

As an alternative to the previously described exemplary embodiments, the radar map may be a three-dimensional radar map, i.e. the radar system is not configured as a 2D radar system (i.e., resolution in azimuth and distance) but as a 3D radar system (i.e., resolution in azimuth, elevation, and distance). By creating a three-dimensional radar map with a three-dimensional radar system, a better delimitation of the ground region from other surrounding regions is possible, i.e. only the regions of the radar map actually representing the ground region can be taken into account in the classification.

According to a further aspect, the present disclosure relates to a computer program product for classifying the ground conditions in the vicinity of a vehicle by means of a radar sensor, the computer program product comprising a computer-readable storage medium with program instructions, the program instructions being executable by a processor in order to cause the processor to perform a method according to one of the preceding embodiments.

According to a further aspect, the present disclosure relates to a radar system for a vehicle, comprising a radar sensor and a control unit, by means of which the reflected portions of a radar signal received by the radar sensor are evaluated. The control unit is configured to:

- calculate information related to a particular discrete spatial region from the received portions of the radar signal;
- assign the information to data structure units of a data structure, each data structure unit being assigned to a fixed geographical location and the assignment of the information taking into account movement information of the vehicle;
- storing a plurality of pieces of information in the respective data structure units, the pieces of information being obtained from reflected portions of radar signals transmitted at different times;
- evaluate the information contained in the data structure by means of a classifier in order to obtain information regarding the ground condition in the vicinity of the vehicle; and
- assign ground condition types characterizing the ground condition to the data structure units, based on the evaluation results obtained by the classifier.

"Classifier" in the sense of the present disclosure means an algorithm or a mathematical function mapping a feature space to a set of classes. In particular, the classifier is configured to analyze the information stored in the data structure units and to identify which ground condition type is to be assigned to the particular information.

"Information derived from the reflected portions of the radar signal" in the sense of the present disclosure means all information derivable by suitable analysis or calculation methods, in particular signal strength, reflected signal amplitude, reflected power or quantities derived therefrom.

"Data structure" in the sense of the present disclosure means any structure storing information, in particular data storage structures. The data structure may be stored, for example, in a volatile or non-volatile memory unit of the radar system, for example a random access memory (RAM).

"Data structure unit" in the sense of the present disclosure means a logical unit within the data structure that can store a plurality of pieces of information such that they are distinguishable from one another. The data structure unit may in particular be formed by a memory area in a memory unit of the radar system.

For the purposes of the present disclosure, the terms "approximately", "essentially" or "circa" mean deviations from the respective exact value by +/−10%, preferably by +/−5%, and/or deviations in the form of functionally insignificant changes.

Further developments, advantages and possible uses of the present disclosure are also apparent from the following description of exemplary embodiments and from the figures. All of the features described and/or illustrated, per se or in any combination, are fundamentally subject matter of the present disclosure, regardless of their summary in the claims or their dependency. The content of the claims is also considered part of the description.

Figure 3:
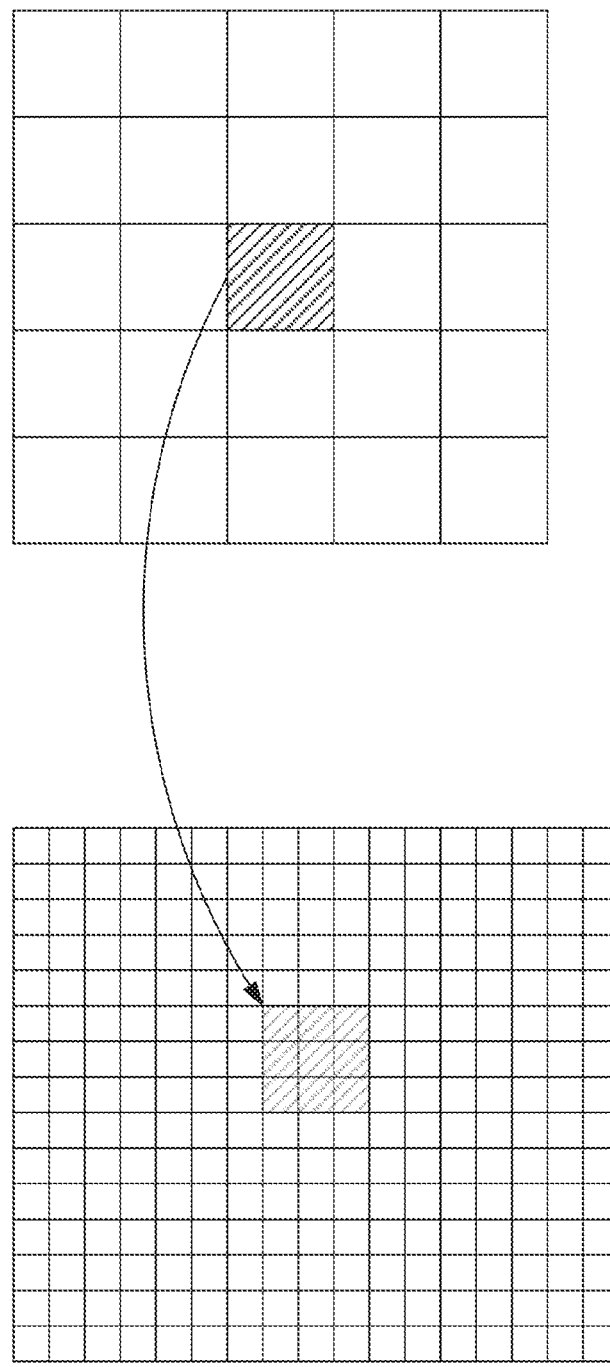
Figure 4:
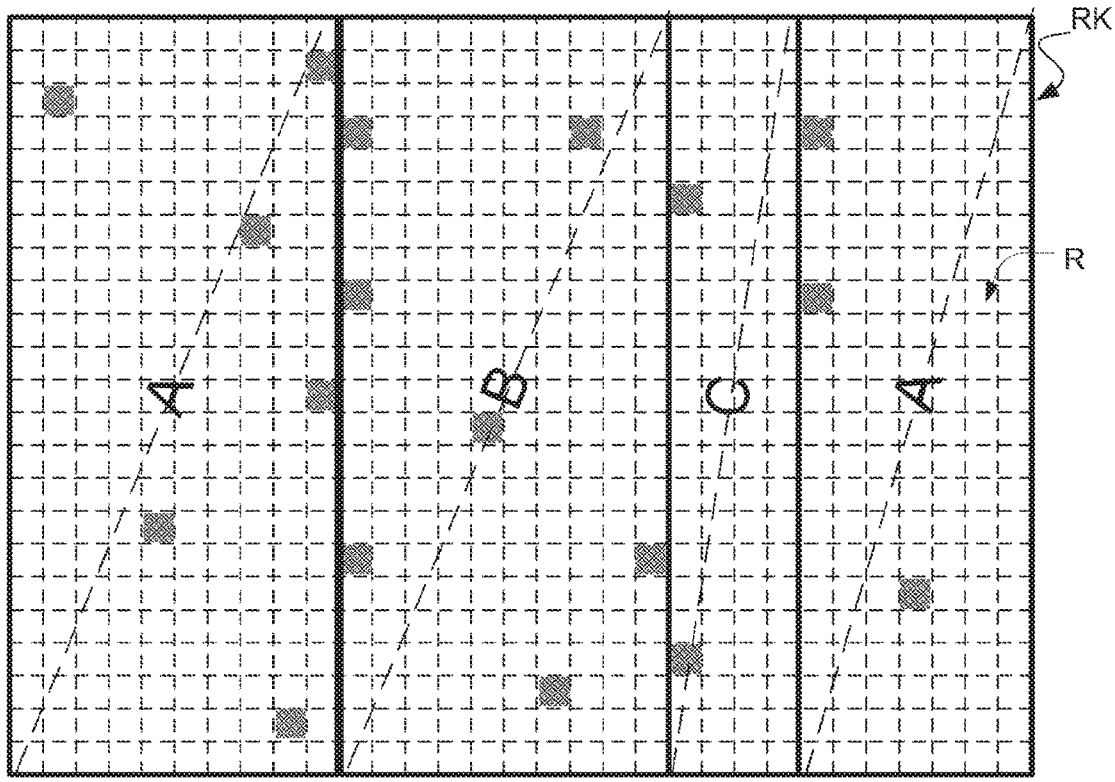
Figure 5:
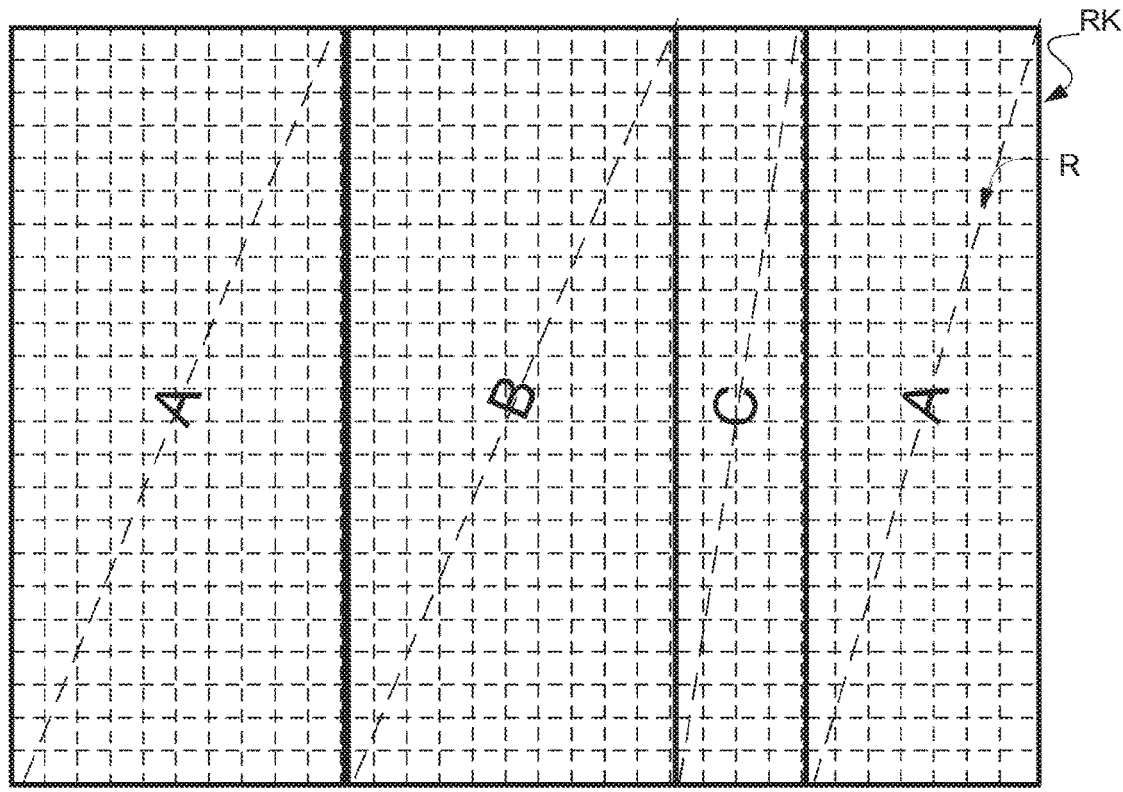
Figure 6:
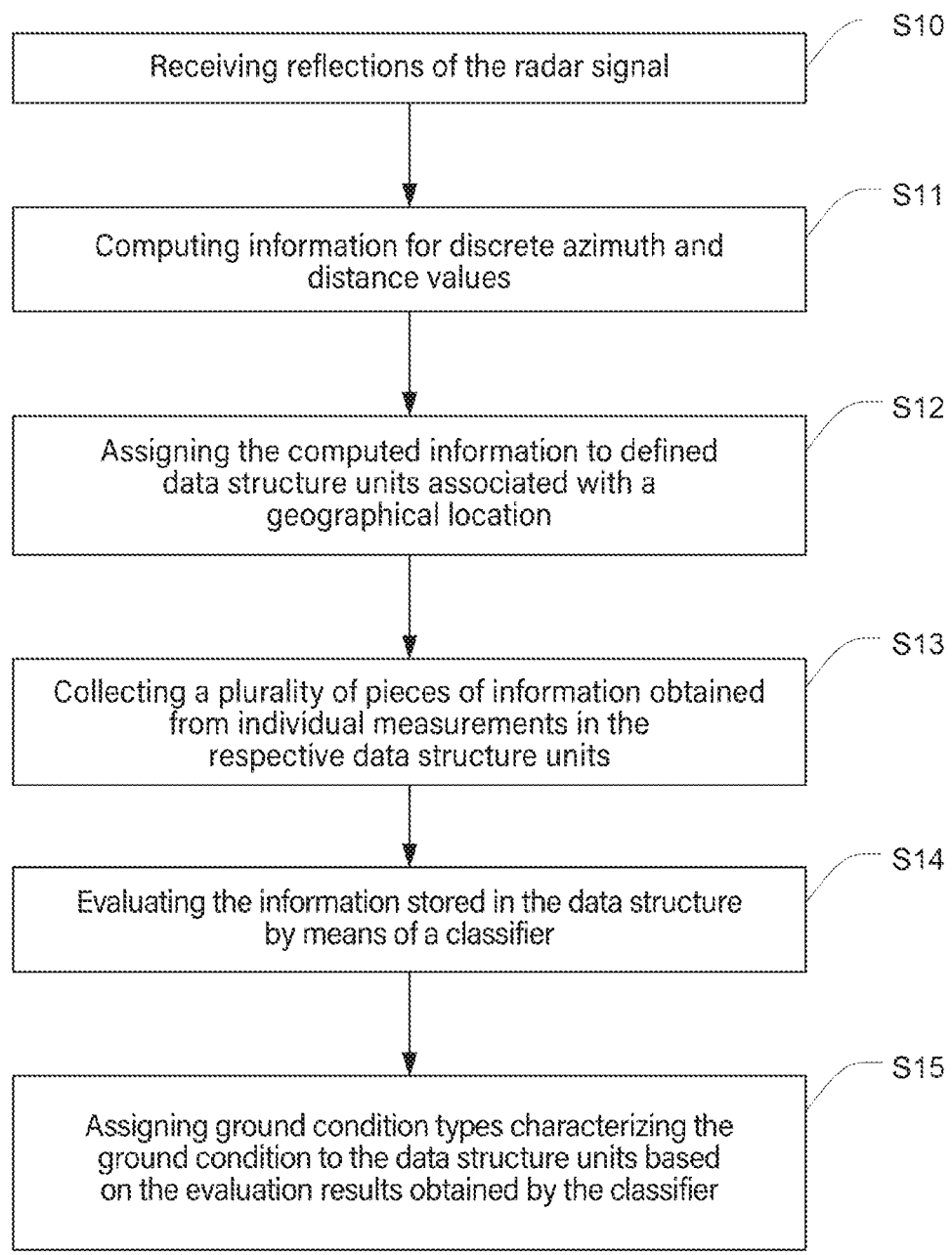
Figure 7:
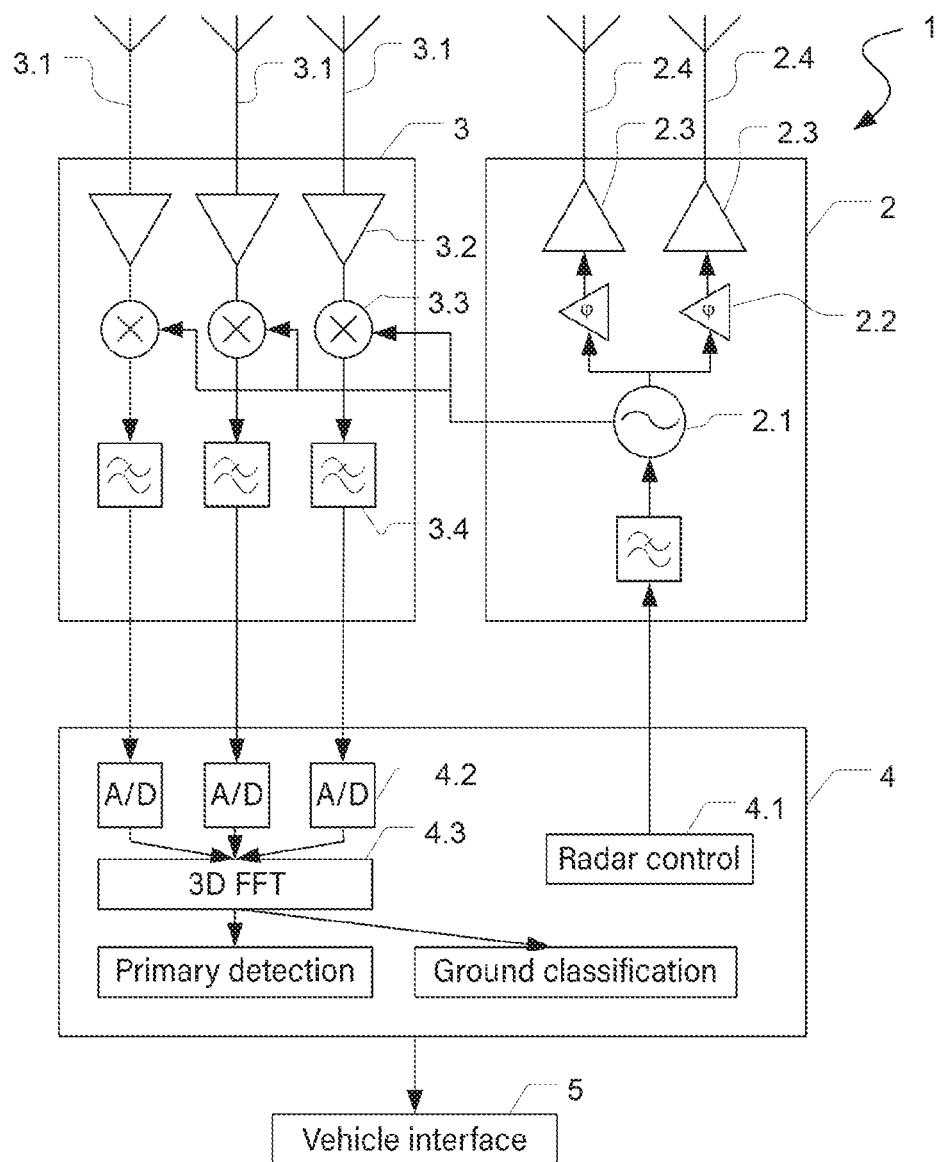

The present disclosure is explained in more detail below with reference to the figures using exemplary embodiments. In the figures:

FIG. 1 schematically shows an example of a radar image obtained by a radar system of a vehicle as a result of an individual measurement;

FIG. 2$a$ shows an example of the spatial and temporal reflection behavior of asphalt;

FIG. 2$b$ shows an example of the spatial and temporal reflection behavior of a pavement with large stone pavers;

FIG. 2$c$ shows an example of the spatial and temporal reflection behavior of grass;

FIG. 3 schematically shows an example of the assignment of a raster region of a radar image moving with the vehicle to a plurality of data structure units of a data structure or a plurality of raster regions of a fixed radar map;

FIG. 4 schematically shows an example of an unadjusted radar map with a plurality of raster regions to which information about ground condition types is assigned;

FIG. 5 schematically shows an example of the adjusted radar map according to FIG. 4;

FIG. 6 shows an example of a block diagram illustrating the method for classifying the ground condition; and FIG. 7 shows an example of a block diagram of a radar system usable for the classification of the ground condition.

FIG. 1 shows an example of a radar image generated by a radar system 1 of a vehicle 10. For example, this is information plotted over azimuth $\Phi$ and distance r, in particular the power spectrum of the portions of the radar signal reflected back to the radar sensor of the radar system 1 after a single measurement and after a Fourier transformation. The density or intensity of the shading is a measure of which proportion of or how much power of the radar signal was reflected back from the respective position in space to the radar sensor 1.1 of the vehicle.

In order to be able to classify the ground conditions in the vicinity, that is, for example, to be able to determine whether the ground in a certain region, in which the vehicle 10 is moving, is grass or asphalt, a plurality of individual measurements (for example in the form of the radar image shown in FIG. 1), their geographical location assigned to the correct position, are used, that is, the vehicle movement between the individual measurements is compensated for and the signal values of a plurality of individual measurements are analyzed in order to obtain information about the ground condition.

For classifying the ground condition into different ground condition types, the radar system 1 comprises a control unit 4. The control unit 4 may be formed by a module in which only the calculation and control steps necessary for the radar system 1 are carried out, for example the received radar signals are converted from analog signals to digital signals and calculations on the digital signals are carried out, in particular the calculations for the transformation into the spectral domain and for the detection of objects (for example configured as a microcontroller control unit). The control unit 4 may be associated with the radar system 1. In particular, it may be provided directly adjacent to the radar sensor and may only perform computing and control tasks of the radar system 1. As an alternative, the control unit 4 may also be formed by a remote control unit which, in addition to processing information from the radar sensor 1.1, also performs other control tasks in the vehicle. In this case, the control unit 4 may be connected to the radar sensor 1.1 via a data link with sufficient bandwidth, for example Ethernet or the like. It is also conceivable that, in the case of a remote control unit 4, partial processing of the received radar signals is already carried out in or in the immediate vicinity of the radar sensor 1.1, for example an analog/digital conversion, so that digitized received radar signals can be transmitted to the remote control unit 4.

In order to detect objects with a large radar cross section (RCS) and thus a high power of the portions of the radar signal reflected back by this object, signal values with an amplitude below a threshold value are often cut away to thereby suppress portions reflected by non-target objects or the background noise and thus achieve high-performance signal processing.

In order to classify the ground condition into different ground condition types, however, these low-amplitude signal values are stored across a plurality of individual measurements, taking into account the geographic location of the respective reflection. Subsequently, these signal values of the individual measurements related to a defined geographical location are evaluated and analyzed by a suitable classification method in order to determine, on the basis of the low-amplitude signal values, which ground condition type is present at the respective geographical location.

The present disclosure is based on the finding that the reflection characteristics differ depending on the ground structure present. For example, grass has a very diffuse reflection characteristic, whereas asphalt causes a spatially highly concentrated reflection, similar to a mirror. Pavement, on the other hand, for example pavement with large stone or small stone paving, has a different reflection characteristic arising due to the periodic or essentially periodic joints or spaces between the pavers.

Figure 2A:
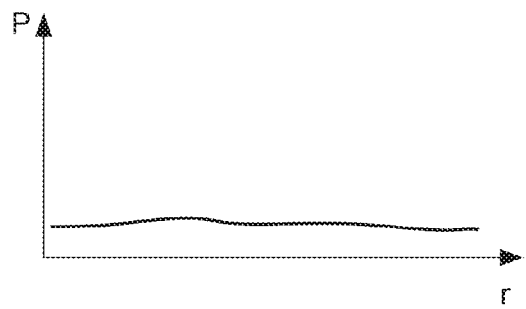
Figure 2A:
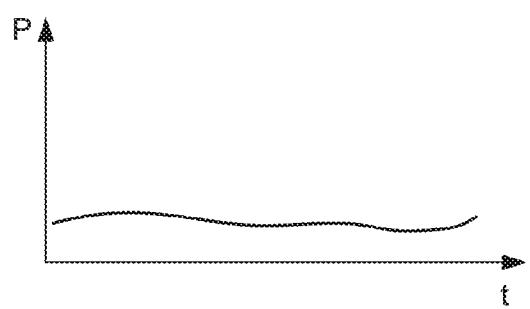
Figure 2B:
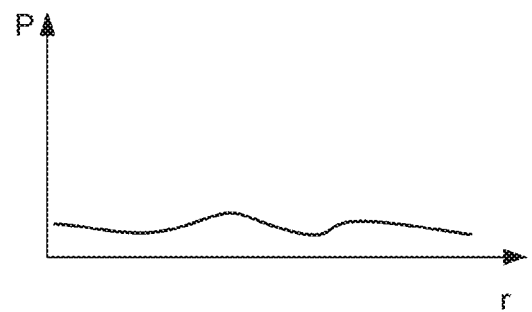
Figure 2B:
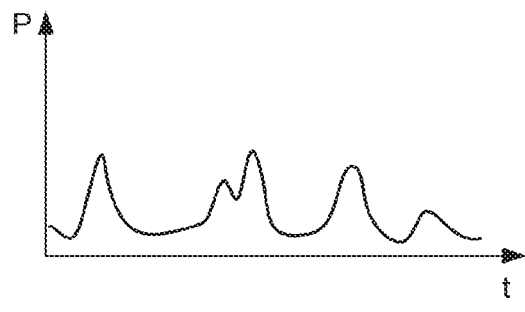
Figure 2C:
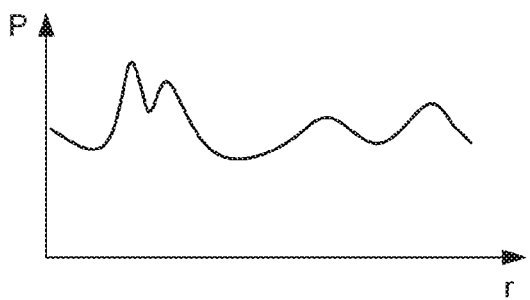
Figure 2C:
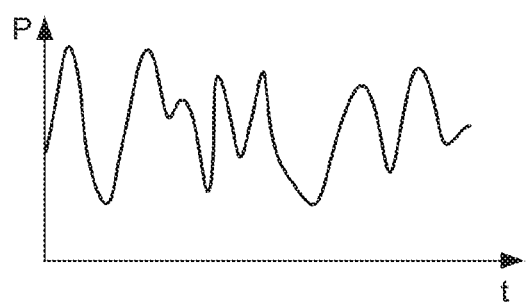

FIGS. 2*a* to 2*c* schematically show an example of the reflected power (P, vertical axis) for different ground conditions plotted over the location r (left diagrams) or over time t (right diagrams). Here, the diagrams in FIG. 2*a* show the location-dependent and time-dependent reflected power in case of asphalt, the diagrams in FIG. 2*b* show the location-dependent and time-dependent reflected power in case of pavement with large stone paving, and the diagrams in FIG. 2*c* show the location-dependent and time-dependent reflected power in case of grass or a meadow. The spatial and temporal profiles show reflected power values in the low amplitude range significantly below the main reflections (e.g., vehicles, guard rails, etc.) located in the detected region of the radar system 1. The reflected power values in the low amplitude range are, for example, 15 dB to 30 dB lower than the power values of the main reflections.

As previously stated, the radar image shown in FIG. 1 shows an instantaneous representation of a single measurement, which is time-variant due to the movement of the vehicle, that is, the radar image changes when individual measurements are carried out sequentially.

In order to obtain a database with regard to the reflection characteristic of the ground that is independent of the movement of the vehicle 10, the radar system 1 comprises a data structure comprising a plurality of data structure units. The data structure may be stored in a storage unit, for example, and the data structure units represent areas in this storage unit, for example logical storage areas. These storage areas are used to store a plurality of pieces of information, each of which was determined sequentially from individual measurements. The information can be obtained, for example, by means of a digital transformation (Fast Fourier Transformation, FFT) from the received reflected portions of the radar signal of a respective individual measurement. The information may relate, for example, to the amplitude of the received reflected portion of the radar signal, to the power of the received reflected portion of the radar signal, etc., or may be measurement values derived from these quantities.

The data structure units are each assigned to a fixed geographical location, i.e. each data structure unit includes pieces of information all relating to reflections at one and the same defined geographical location. The information included in the data structure units of the data structure may thus be used to generate a geographically fixed radar map (see FIGS. 4 and 5), the information contained in the data structure units indicating the time evolution of a measurement variable resulting from the reflections at a particular location in the radar map. In other words, the data structure units are each assigned to a raster region of a raster of a fixed radar map, and information attributable to reflections that occurred at the geographical location assigned to the respective raster region of the fixed radar map is stored in these data structure units.

In order to enable a positionally correct transfer of the signal values of the radar image according to FIG. 1 into the data structure units of the data structure, it is necessary to compensate for the movement of the vehicle 10, i.e., to assign the information of the radar image in a positionally correct manner to one or more data structure units of the data structure based on the movement information of the vehicle. Movement information available in vehicle 10, for example from vehicle odometry, may thus be used to assign the information obtained in the respective individual measurements to the respective data structure units and to store the information in the respective data structure units. Thus, after performing a plurality of individual measurements, each data structure unit includes a series of pieces of information recorded at different times, which result from reflections on a fixed geographical region.

The radar image shown in FIG. 1 is formed by a large number of discrete pieces of information calculated on the basis of an individual measurement. In particular, the information is calculated at discrete azimuth and distance values. The spatial discretization in the respective individual measurement (i.e., the radar image) and the division of the data structure into data structure units corresponding to a spatial discretization may be the same or different. In particular, the data structure may be discretized more finely than the spatial discretization on which the individual measurement is based (super-resolution principle). As a result of the higher discretization of the data structure compared to the spatial discretization of the radar image moving with the vehicle, a signal value is not assigned to a single data structure unit but to a group of a plurality of data structure units, as is shown by way of example in FIG. 3. The information obtained by the radar system 1 (illustrated by the hatched box in the upper raster according to FIG. 3) is assigned to a plurality of data structure units (one data structure unit corresponds to one box in the lower raster according to FIG. 3) or raster regions of the fixed radar map or is stored therein.

When the vehicle moves on, its position relative to the reflection point and thus the assignment of the radar image according to FIG. 1 to the data structure change. Therefore, the raster assignment in FIG. 3 also changes. The higher spatial discretization of the data structure provides a higher resolution and thus allows for improved accuracy in the classification of the ground conditions.

The information stored in the data structure units of the data structure is fed to a classifier for classification of the ground conditions. This classifier is configured to evaluate the information stored in the data structure with regard to temporal and spatial changes thereof. The aim of the evaluation is to determine which ground condition type, e.g. grass, pavement, asphalt, ice, vegetation (e.g. bushes), etc., is present at the respective geographical location.

Any computer-implemented algorithm that is suitable for recognizing features in the information stored in the data structure and assigning these features to a class may be used as the classifier, so that the classifier outputs the ground condition type that is the closest match for the information stored in a data structure unit as a result (also called pattern recognition). Statistical classification methods, machine learning methods (e.g., deep learning algorithms, in particular deep learning with "convolutional neural networks" (CNNs)) or model-based methods may be used as classifiers.

The classification can be performed solely on the pieces of information that are obtained at different times and stored in a single data structure unit. The classification is preferably performed on the basis of information from a plurality of data structure units, so that in particular reflected portions of the radar signals with a close spatial relationship are evaluated. In particular, both the change in information over time and space may be used for classification.

FIG. 4 shows an example of a classification result of a region in the vicinity of a vehicle 10. The result is spatially discrete information in the form of a radar map RK indicating which type of ground condition is present at the respective spatially discrete position. Here, for example, a raster region R of the raster of the radar map RK in FIG. 4 corresponds to a data structure unit of the previously described data structure. The different hatching or filling of the raster regions R represents different ground condition types. For example, the left and right strips marked with the capital letter "A" may each represent grass areas, the narrower strip marked with the letter "C" may represent a paved walkway and the wider strip marked with the letter "B" may represent an asphalted road or lane.

As can be seen in FIG. 4, the classification result may have errors or inaccuracies. These are represented by the isolated, irregularly arranged boxes, which are colored in contrast to their direct surrounding area.

These errors or inaccuracies may be corrected by suitable methods in order to arrive at a corrected classification result shown in FIG. 5. It is assumed that, in a large region of a certain ground condition type, there are no spatially highly limited regions of another ground condition type, for example no very small asphalt region in a grassy area. The error correction may be carried out by reclassifying the spatially limited regions of the other ground condition type into the ground condition type that is in the immediate vicinity of the erroneous regions. Known algorithms may be used therefore, for example model-based smoothing methods, curve approximation methods, low-pass filters, etc.

The corrected radar map RK shown in FIG. 5 may be used to identify passable regions in the vicinity of the vehicle, to determine boundary lines between the individual regions and thus to estimate the course of the road. The information obtained by the radar system 1 may be used redundantly or complementarily to other sensor systems of the vehicle 10, for example imaging systems (camera, etc.).

FIG. 6 schematically shows a block-based flowchart of a method for classifying the ground condition in the vicinity of a vehicle 10.

First, reflections of a radar signal are received in step S10. In the case of an individual measurement, one or more radar signals are emitted by the radar sensor 1.1 and the reflected portions of the radar sensor 1.1 stemming from these radar signals are received again.

From the received portions of the radar signal, information is calculated for discrete spatial regions, for example signal values representing a measure of the reflectivity of the respective spatial region (S11). The information or signal values may be, for example, amplitude values indicating the reflected power at the respective spatial region. The reflections may be represented in a radar image with a spatial relation to the vehicle 10, for example based on a coordinate system using the vehicle 10 as a reference point.

The calculation is carried out, for example, by means of a transformation method, for example a FFT, in particular a 3D FFT. The calculation may be performed in a control unit 4 which is directly associated with the radar system 1 and, for example, carries out the aforementioned calculations and possibly control tasks at the radar sensor 1.1. Alternatively, the control unit 4 may be a higher level control unit which, in addition to the radar system 1, also carries out control tasks for other systems of the vehicle 10.

The information obtained by the calculation is then assigned to data structure units of a data structure (S12). The data structure units form, for example, stack-like memory areas in which a plurality of pieces of information resulting from individual measurements obtained at different times can be stored. The data structure units are, for example, each assigned to a raster region of a fixed radar map RK (also called a radar grid), i.e. each data structure unit stores information that results from reflections on the spatial region assigned to the respective data structure unit.

In order to obtain information that can be assigned to the data structure units from the information that relates to the vehicle and thus is radar information moving with the vehicle, the information must be transformed into information related to a fixed geographical position using movement information of the vehicle. This can be achieved, for example, using vehicle odometry data.

In order to obtain information from different locations (during the movement of the vehicle 10) and at different times, a plurality of individual measurements are carried out in succession and assigned to the data structure units in accordance with the previous steps (S13). After a plurality of individual measurements have been carried out, the data structure units thus contain a plurality of pieces of information resulting from reflected portions of radar signals transmitted at different times and at different locations (due to the movement of the vehicle 10).

The information stored in the data structure is subsequently input to a classification method in order to classify the ground condition according to predetermined ground condition types based on the information stored in the data structure (S14). Here, the classifier may only use information from a single data structure unit assigned to the raster region for classifying said raster region. However, it is preferred that the classification of a raster region is carried out using a plurality of data structure units correlated with raster regions closely spatially related to the raster region to be classified.

As a result of the classification process, ground condition types are assigned to the data structure units and thus to the raster regions assigned to these data structure units (S15). Thus, a radar map with raster regions is created, with each raster region being assigned to a ground condition type determined by the radar system 1. This allows for boundary lines between different ground condition types to be determined which can be used, for example, to estimate the course of the road or the redundant detection thereof.

FIG. 7 schematically shows an example of a block diagram of a radar system 1 that can be used to classify the ground condition. The radar system 1 comprises a transmitter unit 2, a receiver unit 3 and a control unit 4. The control unit 4 includes a radar control unit 4.1 connected to the transmitter unit 2 in order to suitably drive an RF signal generator 2.1 in the transmitter unit 2. The RF signal generator 2.1 may be, for example, a voltage-controlled oscillator (VCO) or a phase-locked loop (PLL). Here, the radar system 1 may use a frequency in the range of 24 GHz or in the range of 76 GHz to 81 GHz. A radar system in the range of 76 GHz to 81 GHz is preferred, since higher resolutions can be achieved due to the larger bandwidth. The signal generated by the RF signal generator 2.1 may preferably be transmitted via phase shifters 2.2 to an amplifier unit which amplifies the signal and feeds it to the transmitter antenna 2.4.

The receiver unit 3 has at least one receiver antenna 3.1 coupled to at least one amplifier 3.2. Preferably, at least two receiver antennas 3.1 are provided in order to achieve a desired receiving characteristic at the receiver unit 3 (beamforming). The amplifiers 3.2 are coupled to a mixer 3.3 on the output side. The mixer 3.3 is supplied with the transmission signal, i.e. the signal generated by the RF oscillation generator 2.1, in order to downmix the received signal based on the transmission frequency of the transmission signal. In particular, the radar system 1 may be a so-called continuous wave radar (frequency modulated continuous wave radar, FMCW radar). At the output of the mixer 3.3, the so-called beat frequency created by mixing the received signal with the transmission signal is available. The downmixed signals may then be low-pass filtered in low-pass filters 3.4.

These optionally filtered output signals of the mixer 3.4 are then fed to the control unit 4. The control unit 4 causes digital signal processing of the output signals of the receiver unit. In particular, the low-pass filtered output signals of the mixer 3.3 are converted to digital signals by an analog/digital converter 4.2. These digitized signals are converted to the spectral domain using a transformation method, for example a three-dimensional Fast Fourier Transformation (3D-FFT) 4.3.

At the output of the 3D FFT unit 4.3, spatially resolved information regarding the reflected portions of the radar signal and the signal strength thereof are available. On the one hand, this information can be used for primary detection, i.e., objects causing strong back reflections may be recognized. Here, the speed of the objects may also be determined using the Doppler effect.

Furthermore, the output signals of the 3D FFT unit 4.3 may be used, as previously described, to classify the ground condition into ground condition types.

In particular, the control unit 4 and the functionality thereof may be implemented by a microprocessor or a control unit containing a microprocessor. The output signals of the control unit 4 are then transmitted to one or more higher-level control units via a vehicle interface 5, for example via a vehicle bus system (e.g. CAN bus).

The present disclosure has been described above using exemplary embodiments. It is to be understood that numerous changes and modifications are possible without thereby leaving the scope of protection defined by the patent claims.

LIST OF REFERENCE SYMBOLS

1 Radar System
1.1 Radar sensor
2 Transmitter unit
2.1 Oscillator
2.2 Phase shifter
2.3 Amplifier
2.4 Transmitter antenna
3 Receiver unit
3.1 Receiver antenna
3.2 Amplifier
3.3 Mixer
3.4 Low-pass filter
4 Control unit
4.1 Radar control unit
4.2 Analog/digital converter
4.3 3D FFT unit
5 Vehicle interface
10 Vehicle
R Raster region
RK Radar map

The invention claimed is:

1. A method for classification of ground conditions in a vicinity of a vehicle using a radar sensor, comprising the following steps:
  receiving reflected portions of a radar signal at a receiver unit of a radar system;
  calculating information derived from the received portions of the radar signal for discrete spatial regions by said radar system or a control unit connected thereto;
  assigning the information to data structure units of a data structure, each data structure unit being associated with a fixed geographical location and the assignment of the information taking into account movement information of said vehicle;
  collecting a plurality of pieces of information in the respective data structure units, the pieces of information being obtained from reflected portions of radar signals transmitted at different times;
  evaluating the information contained in the data structure using a classifier in order to obtain information regarding the ground condition, wherein, in the evaluation of the information contained in said data structure using a classifier, only information with an amplitude or signal strength below a threshold value or a threshold value curve is used; and
  assigning ground condition types characterizing the ground condition to said data structure units based on evaluation results obtained by said classifier.

2. The method according to claim 1, characterized in that only information generated due to reflections on non-moving targets is used for the classification of the ground condition.

3. The method according to claim 1, characterized in that the information stored in the data structure is signal values or measurement values proportional to the power of the reflected portion of the radar signal in a discrete spatial region or quantities derived therefrom.

4. The method according to claim 1, characterized in that the information stored in the data structure is signal values or measurement values assigned to the data structure units without magnitude limitation or without trimming in a lower amplitude range of the signal values, or quantities derived therefrom.

5. The method according to claim 1, characterized in that each data structure unit is assigned to a raster region of a two-dimensional or three-dimensional radar map.

6. The method according to claim 5, characterized in that information associated with a particular discrete spatial region is assigned to a single data structure unit or that information associated with a particular discrete spatial region is assigned to a plurality of data structure units, said data structure units being correlated with adjacent raster regions of the two-dimensional or three-dimensional radar map.

7. The method according to claim 1, characterized in that the evaluation of the information contained in said data structure is carried out separately based on the information contained in one data structure unit.

8. The method according to claim 7, characterized in that the information contained in a data structure unit of said data structure is evaluated with regard to temporal/spectral properties.

9. The method according to claim 1, characterized in that the evaluation of the information contained in said data structure is performed based on groups of data structure units, each group of data structure units containing a plurality of data structure units correlated with adjacent raster regions of a two-dimensional or three-dimensional radar map.

10. The method according to claim 9, characterized in that the information contained in a plurality of data structure units of said data structure is evaluated across data structure units with regard to temporal/spectral and/or spatial properties.

11. The method according to claim 1, characterized in that the classifier uses statistical classifiers, machine-learning or model-based methods.

12. The method according to claim 1, characterized in that a correction step is carried out, wherein ground structure types at least partially assigned to the data structure units are corrected based on information from data structure units correlated with adjacent raster regions of a two-dimensional or three-dimensional radar map.

13. The method according to claim 1, characterized in that a course of a road is estimated based on the ground condition types assigned to the data structure units.

14. A computer program product for classification of the ground conditions in the vicinity of a vehicle by means of a radar sensor, the computer program product comprising a computer-readable storage medium including program instructions, the program instructions being executable by a processor in order to cause the processor to execute a method comprising:
receiving reflected portions of a radar signal at a receiver unit of a radar system;
calculating information derived from the received portions of the radar signal for discrete spatial regions by said radar system or a control unit connected thereto;
assigning the information to data structure units of a data structure, each data structure unit being associated with a fixed geographical location and the assignment of the information taking into account movement information of said vehicle;
collecting a plurality of pieces of information in the respective data structure units, the pieces of information being obtained from reflected portions of radar signals transmitted at different times;
evaluating the information contained in the data structure using a classifier in order to obtain information regarding the ground condition, wherein, in the evaluation of the information contained in said data structure using a classifier, only information with an amplitude or signal strength below a threshold value or a threshold value curve is used; and
assigning ground condition types characterizing the ground condition to said data structure units based on evaluation results obtained by said classifier.

15. A radar system for a vehicle comprising a radar sensor and a control unit, by means of which reflected portions of a radar signal received by said radar sensor are evaluated, said control unit being configured to:
calculate information from the received portions of the radar signal related to a particular discrete spatial region;
assign the information to data structure units of a data structure, each data structure unit being associated with a fixed geographical location and the assignment of the information taking into account movement information of the vehicle;
store a plurality of pieces of information obtained from reflected portions of radar signals transmitted at different times in the respective data structure units;
evaluate the information contained in the data structure by means of a classifier in order to obtain information regarding a ground condition in a vicinity of said vehicle, wherein, in the evaluation of the information contained in said data structure by means of a classifier, only information with an amplitude or signal strength below a threshold value or a threshold value curve is used;
assign ground condition types characterizing the ground condition to said data structure units based on the evaluation results obtained by said classifier.

* * * * *